May 12, 1953  J. B. BARTOW ET AL  2,638,554
DIRECTIVITY CONTROL OF X-RAYS
Filed Oct. 5, 1949  6 Sheets-Sheet 3

Inventors:
John B. Bartow
Jack A. Bartow
Grey D. McLaughlin Jr.
by their Attorneys
Howson & Howson

May 12, 1953     J. B. BARTOW ET AL     2,638,554
DIRECTIVITY CONTROL OF X-RAYS Filed Oct. 5, 1949     6 Sheets-Sheet 5

Inventors:
John B. Bartow
Jack A. Bartow
Grey D. MacLaughlin Jr.
by their Attorneys
Howson & Howson Patented May 12, 1953

2,638,554

UNITED STATES PATENT OFFICE 2,638,554

DIRECTIVITY CONTROL OF X-RAYS

John B. Bartow and Jack A. Bartow, Blue Bell, and Grey D. MacLaughlin, Jr., Perkiomenville, Pa., assignors to Bartow Beacons Inc., Blue Bell, Pa., a corporation of Pennsylvania Application October 5, 1949, Serial No. 119,734

8 Claims. (Cl. 250—99)

This invention relates to directivity control of X-rays, and while it is intended for application wherever useful, it is particularly applicable to X-ray treatment of the human body. The term "X-rays," as used herein and in the appended claims, is intended to include all rays which may be produced in the practice of the invention and which have the properties of so-called X-rays. For example, certain of the gamma rays are in this category.

It is a matter of common knowledge that X-rays are being used to an ever-increasing extent in the treatment of ailments of the human body, particularly in the treatment of malignant growths such as cancer. Heretofore, however, treatment by means of X-rays has been limited by the inherent deleterious effect of such rays upon healthy bodily tissues. X-ray treatment of cancer, for example, usually requires impingement of X-rays on a diseased spot or local area inside the body, and this necessitates projection of such X-rays through the skin and tissues which are thus subjected to the destructive effects of such rays. While the skin and healthy tissues can withstand moderate "doses" of X-rays, they cannot withstand any prolonged concentration of such rays without harmful effects.

It has long been realized that if X-rays could be focused, it would be possible to concentrate a large number of such rays upon an internal spot or local area of the human body without subjecting the skin and tissues to harmful concentration of the rays. However, at present X-rays cannot be bent or deflected, and this fact has heretofore precluded a successful solution of the problem.

The practice in the past has been to project a narrow "beam" of X-rays into the body and onto the affected spot or area to be treated. This has necessitated movement of the "beam" angularly, while keeping it directed against the affected spot or area, in order to avoid prolonged subjection of any one skin area to the concentrated rays. At best, this practice is far from satisfactory. It involves serious risk of X-ray burns, and furthermore it is extremely limited in effectiveness because of the limited number of X-rays that can be projected in a narrow beam.

The principal object of the present invention is to provide a method and apparatus by which X-rays can be effectively focused to produce concentration of such rays at a focal point or area.

Another object of the invention is to provide a novel X-ray "lens" for the stated purpose.

A further object of the invention is to provide novel constructions of such lens and novel method of making the same.

A further object of the invention is to provide novel X-ray producing devices embodying the lens.

Other objects of the invention will be apparent from the following detailed description with reference to the accompanying drawing, wherein.

Figure 1:
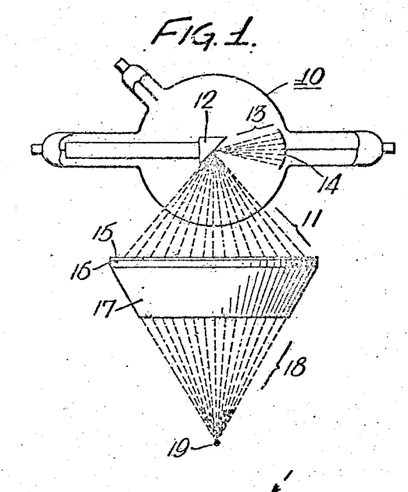
Fig. 1 is a diagrammatic illustration showing the use of the novel lens in conjunction with an ordinary X-ray tube.

Referring first to Fig. 1, there is shown diagrammatically at 10 a conventional X-ray tube which constitutes a source of X-rays represented at 11. As is well known, the X-rays 11 are given off by the anodic target 12 as the latter is struck by electrons, represented at 13, from the cathode 14. For the purpose of this description, it may be assumed that the tube 10 is adapted to produce hard X-rays, as well understood in the art.

Below the tube 10 is a secondary X-ray emitter 15 which may be in the form of a thin plating, e. g. gold or lead, on a plate or disk 16, which is of such character that it constitutes a filter and absorbs soft X-rays while permitting hard X-rays to pass through it. This plate or disk may be composed of any material, e. g. aluminum, which has the desired filtering property.

Below the disk 16 and adjacent thereto is the X-ray "lens" 17 which serves to produce a focusing effect, i. e. the concentration of hard X-rays at a focal point or area. This lens member 17 is a relatively thick body composed of lead or any other suitable material which is non-transmissive to hard X-rays, said body being provided with multitudinous rectilinear X-ray transmissive elements which are convergent toward a focal point.

As a result of the above-described arrangement including the lens member 17, certain of the hard X-rays given off by the secondary source 15 are transmitted convergently toward a focal point. These rays are represented in Fig. 1 at 18 and they are shown meeting at point 19. The manner in which these rays are selectively transmitted will be described presently with the aid of Fig. 3.

Figure 2:
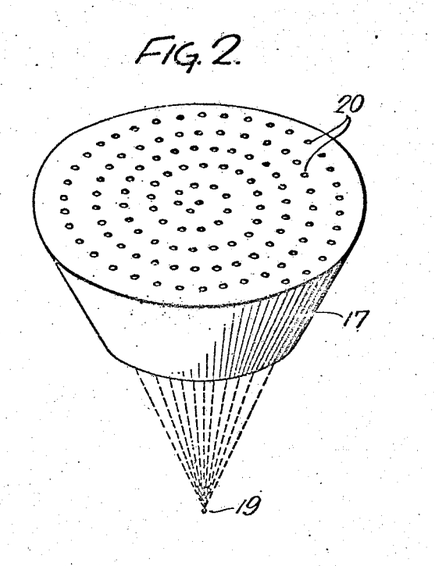
Fig. 2 is a perspective view of the X-ray lens member as utilized in the apparatus of Fig. 1.

While the lens member 17 can be shaped as desired, it is shown in the form of an inverted truncated cone, as may be clearly seen in Fig. 2. The transmissive elements of the lens member may be open holes defining air passages, since air is transmissive to X-rays, or the holes may be filled partly or wholly with material, such as plastic, which is transmissive to X-rays. Exemplary methods of constructing the lens member will be described later. In Fig. 2, the transmissive elements are shown arranged in a spiral 20, but these elements may be arranged in any other manner. For example, they may be arranged in concentric circles or in straight rows.

Figure 3:
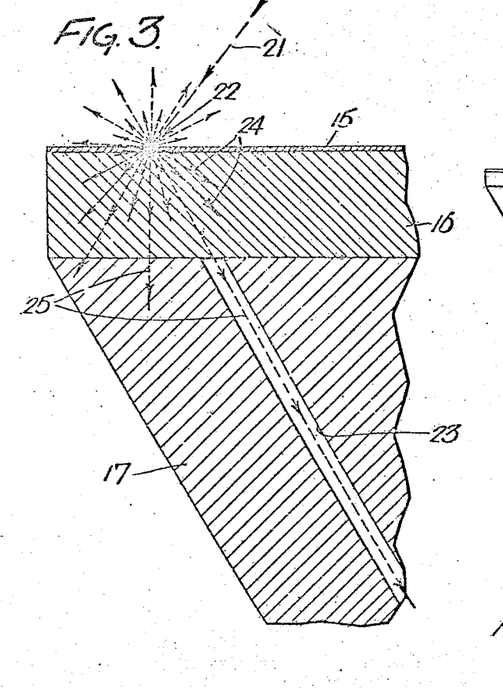
Fig. 3 is a greatly enlarged fragmentary sectional view illustrating the broad principle of the invention.

Considering in greater detail the operation of the arrangement shown in Fig. 1, it will be apparent to those skilled in the art that practically every point on the upper surface of the secondary emitter 15 will be struck by an X-ray from tube 10, and at each point secondary X-rays will be radiated in all directions some of which are hard and others of which are soft. This is depicted in Fig. 3 wherein a single X-ray 21 from tube 10 is shown striking the upper surface of the secondary emitter 15 at point 22 which is aligned with a transmissive element 23 of lens member 17. Radiating from point 22 in all directions are soft X-rays represented by the shorter arrows 24 and hard X-rays represented by the longer arrows 25. The downwardly-directed soft X-rays are absorbed by the filter disk 16 which the downwardly-directed hard X-rays are not. The latter, being of higher energy content, penetrate into the lens member 17. However, only that hard X-ray which is directionally aligned with the transmissive element 23 is transmitted by the lens member 17. By providing a very large number of the transmissive elements in the lens member 17, multitudinous hard X-rays are selectively transmitted from surface points of the secondary emitter 15 to a common focal point or area. In practice the transmissive elements will be very small in cross-section, e. g. of the order of .001" to 0.25" in diameter, the exact size depending upon the size of the focus desired in any instance. It will be apparent therefore that a very large number of such elements may be provided in the lens member 17 which may be of the order of three to twenty inches in diameter.

As a practical matter, it may not be feasible to drill extremely small holes in the lens member to provide the transmissive elements, especially since these elements are to be made accurately convergent toward a common point. One way in which the lens member may be constructed is to mount wires on two spaced supports or frames, and then mold said member between the frames so that the portions of the wires between the frames will extend through the molded member. If the transmissive elements are to be in the form of open holes, the wires may be composed of a material which can be removed after the lens member is molded. For example, the wires could be formed of some metal which could be removed by chemical action, after molding of the member 17, without affecting the latter member. This could be accomplished by forming the wires of a material which would react to some acid to which the lead member 17 would not react. If the wires are not to be removed from the holes, the wires may be formed of a plastic material which is transmissive to X-rays, in which case it would only be necessary to cut the wires at the surface of the member 17 after the latter is molded.

Figure 4:
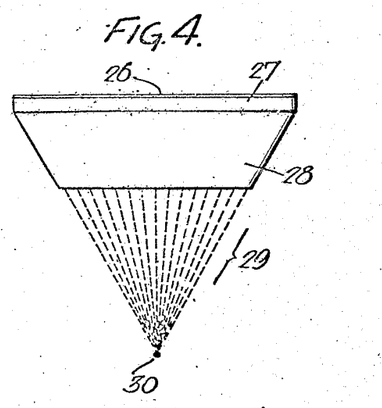
Fig. 4 is an elevational view of a simplified embodiment.

Referring now to Fig. 4, there is shown therein another embodiment of the invention in which it is unnecessary to use an X-ray tube as a primary source of X-rays. In this instance there is provided a plate or disk 26 which in itself is a source of X-rays. The disk may be formed of some material which is naturally radioactive, or it may be formed of a material which, while not naturally radioactive, can be made radioactive. In either case the disk 26 will provide a multiplicity of point sources, each of which will radiate X-rays in all directions.

Below the disk 26 and adjacent thereto is a filter plate or disk 27 which corresponds to the filter disk 16 of the first-described embodiment. This disk serves to absorb or filter out the soft X-rays radiated by the disk 26.

Below and adjacent to the disk 27 is a lens member 28 similar to the lens member 17 of the first-described embodiment. This lens member selectively transmits certain of the hard X-rays from disk 26 toward a focus point, these rays being represented at 29 and the focus point being shown at 30.

It will be apparent from the foregoing description that the invention contemplates the provision of any suitable source of X-rays, and the selective transmission of certain of the radiated X-rays along rectilinear paths converging toward a focal point or area. As shown by the above-described embodiments, the source which supplies the radiated rays for selective transmission may be a secondary source or it may be a primary source.

As hereinbefore mentioned, the present invention is particularly applicable to the X-ray treatment of internal parts of the human body, and when thus applied it affects concentration of X-rays at a particular spot or area within the body, without subjecting the skin or tissues to concentration of the X-rays. Due to the fact that the transmitted X-rays are discretely spaced from one another where they penetrate the skin and tissues, there is no concentration except at the focal point or area. In other words, the rays are spread over a substantial area of the skin and therefore they do not produce any harmful effect upon the skin or tissues.

Of course, even with the spacing of the X-rays at the skin and tissues it would be unwise to subject any particular point or spot on the skin to prolonged exposure to an X-ray. Therefore, in any prolonged treatment of a particular internal spot or area it is advisable to move the projected X-rays while keeping them focused on the same spot or area, in order that different points or spots on the skin will be exposed to the X-rays. This is readily accomplished by moving the X-ray projecting apparatus relative to the body being treated. Consider, for example, movement of the device of Fig. 4. The movement may be translatory, in which case the device is moved angularly about the focal point as a center. Or the movement may be one of rotation, in which case the device is rotated about the axis of symmetry of the lens. By suitable arrangement of the transmissive elements of the lens, the rotational movement can be made to give coverage of practically all points of a skin area so that they will all share the X-ray impingement. The spiral arrangement as shown in Fig. 2 will achieve this end, as will also the preferred lens construction now to be described.

Figures 5, 6, 7, 8, 9, 10, 11, 12, 13:
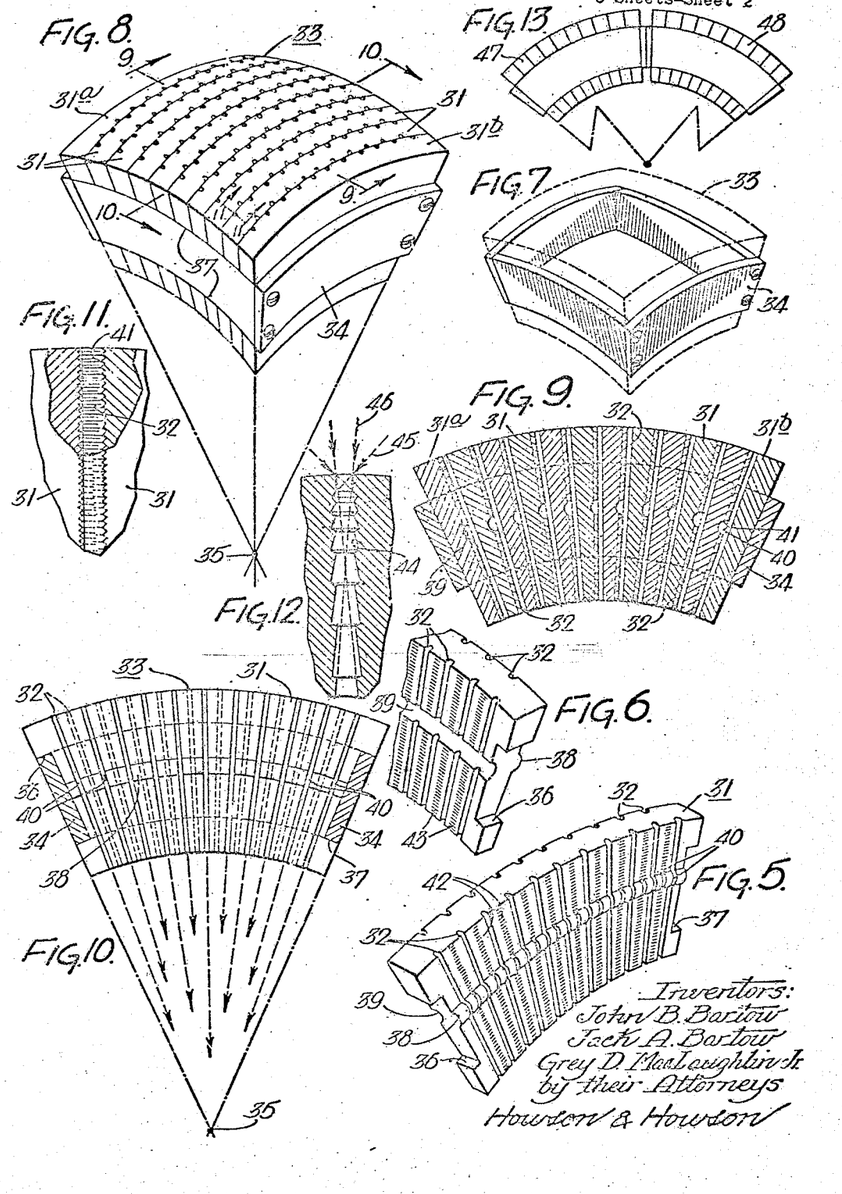
Fig. 5 is a perspective view of a segment of a preferred form of the lens.
Fig. 6 is a fragmentary perspective view of the segment taken from the opposite side.
Fig. 7 is a perspective view of a frame for supporting the lens segments.
Fig. 8 is a perspective view of the complete lens assembly.
Fig. 9 is a sectional view taken on line 9—9 of Fig. 8.
Fig. 10 is a sectional view taken on line 10—10 of Fig. 8.
Fig. 11 is a detail sectional view taken on line 11—11 of Fig. 8.
Fig. 12 is a sectional view similar to Fig. 11 but showing a modification.
Fig. 13 is an illustration of a multiple arrangement of lenses.

Figs. 8 to 12 illustrate a preferred construction of the lens member and a preferred method of making the same. According to this method, the lens member is made up of a plurality of segments of lead or other suitable material, such as shown at 31 in Fig. 5, the sections collectively forming the complete lens member. Referring to Fig. 5 the section shown is arcuate lengthwise and is tapered both widthwise and depthwise, so that it is actually a section of a sphere. Along each face of the segment there are provided small grooves 32, all of which converge toward a common focal point which coincides with the center of a sphere of which the segment is a section. A plurality of such segments are placed side by side, as shown in Fig. 8, to form the complete lens member 33, and they are held in assembled relation in any suitable manner, as by means of a frame 34 which may be utilized as an assembling frame. As may be seen in Fig. 8 the grooves of adjacent segments are offset from one another or in staggered relation. It will be noted also that the end segments 31a and 31b are provided with grooves only along their inner faces. The corner edges of the assembled lens member are convergent toward a point 35, and the passages formed by the grooves are also convergent toward that point. Thus the assembled lens member is actually a segment of a sphere whose center is the point 35, and all of the X-ray transmissive passages of the lens members are convergent toward that point. This is more clearly apparent from the sectional illustration of Fig. 10.

An important advantage of forming the lens member in the manner above described is that the segments can be die cast or formed in any other simple manner. A further advantage of this construction is that it lends itself to multiple assemblage as hereinafter described.

In order to hold the segments firmly within the frame 34, each segment may be provided with recesses 36 and 37 at its ends, as shown in Fig. 5, said recesses being conformed to the sides of the frame 34 so that the segments may be slidably inserted in the frame with the screw-attached end thereof removed.

In order to prevent X-rays from being transmitted through any minute space that may exist between the assembled segments, each segment is provided with a rib 38 on one face and a recess 39 on the other face, as shown in Fig. 5. The ribs and recesses of the segments interfit with one another, as may be seen in Fig. 9. Each rib is provided with slots 40 so as not to interfere with the transmission of X-rays through the convergent passages. This arrangement prevents the existence of any rectilinear path through which X-rays might pass, except the convergent passages of the lens member.

It is inevitable that some of the X-rays entering the passages of the lens member will strike the internal surfaces of the passages and will cause the production of secondary X-rays. In order to effect absorption of such secondary X-rays and to prevent them from passing out of the lens member, the surfaces of the passage-forming grooves are provided with ridges as shown at 41 in Fig. 11, and the face portions of each segment which cooperate with the grooves of adjacent segments are also provided with ridges as shown at 42 and 43 in Figs. 5 and 6. These ridges may be provided by coining or in any other suitable manner. These ridges cause any secondary X-rays produced within the lens member to be trapped and absorbed.

Preferably, the ridges are shaped as shown at 44 in Fig. 12 to provide shoulders of progressively greater spacing. X-rays such as represented at 45 which enter the passage at a substantial angle will strike one of the shoulders, and the secondary rays produced thereby will radiate back toward the entrance or will be absorbed. Other X-rays, such as represented at 46, which do not strike the shoulders will pass through the lens.

As mentioned above, the segmental construction of the lens member enables multiple assemblage. Since the lens member is actually a segment of a sphere, a plurality of such members may be assembled and they will all have a common focus point. Fig. 13 shows two assembled lens members 47 and 48 which are simply placed side by side. This multiple assemblage may be extended to cover any section of a sphere.

Figs. 14 to 20 show various X-ray producing devices embodying the invention, and it will be apparent from these illustrations that the invention is capable of many embodiments of which those illustrated are merely examples.

Figure 14:
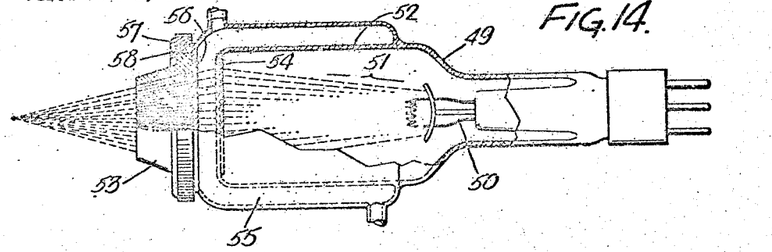
Figs. 14 to 20 are illustrations of various X-ray producing devices embodying the invention.

In Fig. 14 there is shown an X-ray tube comprising a glass envelope portion 49, a cathode assembly 50 supported thereby and adapted to produce an electron stream 51, a metal envelope portion 52, a lens 53 of the character above described, and a thin X-ray emitter 54, which may be in the form of a thin plating or coating of a suitable material such as tungsten. The tube may be cooled by means of a water jacket 55 which may be integral with the metal envelope portion 52 and which is provided with an X-ray transmissive window 56 of beryllium or like material. The lens 53 may be removably supported by a retaining ring 57 threadedly attached to an annular projection 58 on jacket 55. By this arrangement different lenses may be used. An X-ray tube as shown in Fig. 14 and including the lens member 53 will emit only X-rays which are convergent toward a focal point or area.

Figure 15:
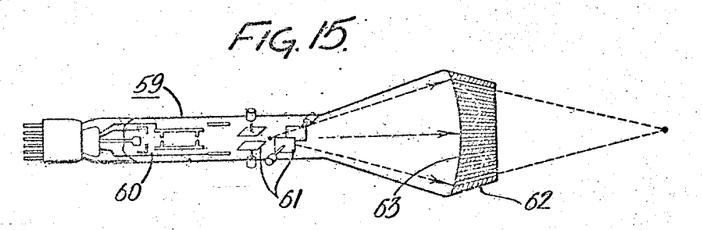

In some instances it may be desirable to utilize a narrow electron beam and to scan an X-ray producing surface. Fig. 15 shows a tube 59 having a conventional beam-forming arrangement or gun as represented generally at 60, and also provided with deflecting plates 61. At the target end of the tube there is provided an X-ray lens 62 and an X-ray producing surface 63, which may be scanned by the electron beam.

Figure 16:
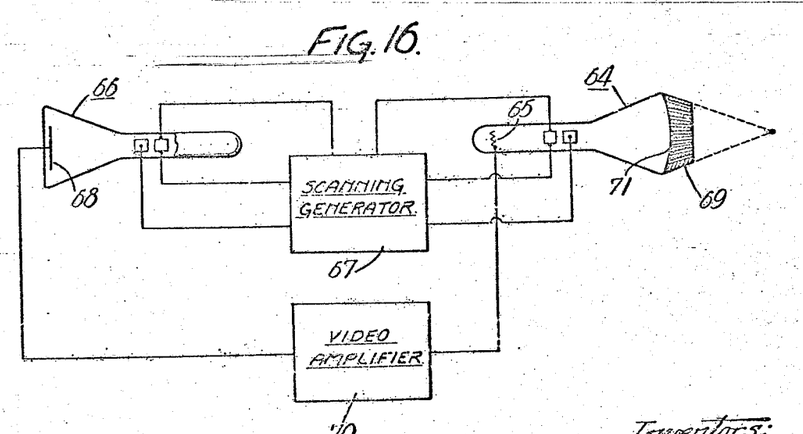

An application of this type of tube is shown in Fig. 16 wherein the X-ray tube is designated 64. In the arrangement shown, the electron beam is deflected in a scanning motion, and it is also turned on and off by means of a control grid 65. A monoscope 66 is utilized for the latter purposes. The electron beams of both tubes are given synchronous scanning motions by a common scanning generator 67 which generates the scanning voltages that are applied to the deflecting plates of the tubes. The target plate 68 of the monoscope has a pattern thereon corresponding to the pattern of the entrance face of the X-ray lens 69. The signal produced by the monoscope is passed through a video amplifier 70 and is applied to the grid 65 of the X-ray tube so as to key the electron beam of that tube. By this arrangement the electron beam is turned on only when it will strike the portions of the X-ray emitter 71 adjacent the passages of the lens 63.

Figure 17:
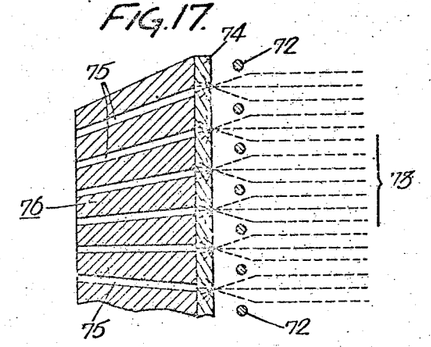
Figure 18:
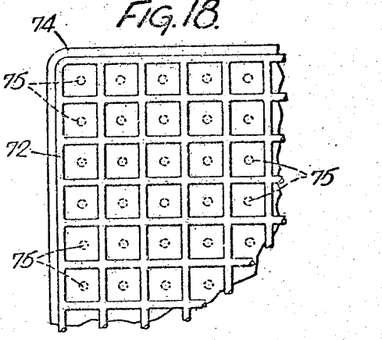

In some instances it may be advantageous to use a negatively charged grid to effect concentration of the electron stream at the portions of the X-ray emitter adjacent the lens. This is illustrated in Figs. 17 and 18 wherein a negatively charged grid 72 is arranged to concentrate the electrons 73 at the portions of the X-ray emitter 74 adjacent the passages 75 of the X-ray lens 76.

Figures 19A, 19B, 20A, 20B:
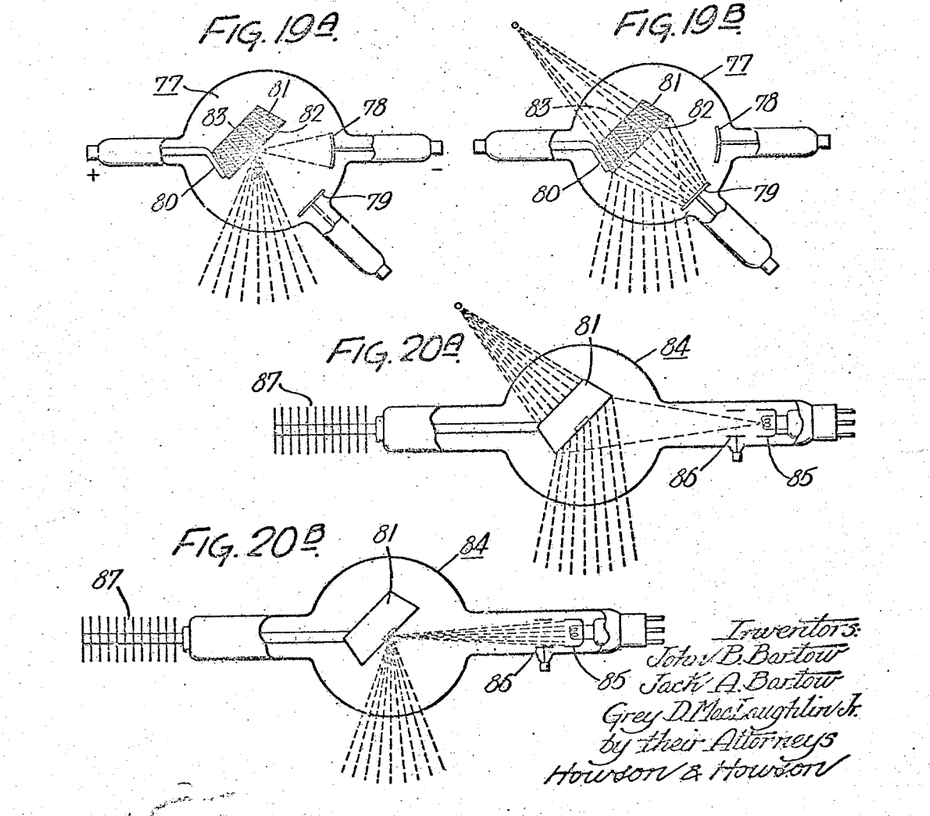

In addition to the foregoing examples, it is possible to utilize the invention in a multipurpose tube such as shown in Figs. 19A and 19B. As illustrated, the tube 77 may have two cold cathodes 78 and 79, and an anode structure 80 comprising the lens member 81 with a copper plating 82 and a centrally located tungsten button 83. The two cathodes are selectively operable. When the cathode 78 is operable, as shown in Fig. 19A, it projects a directed beam of electrons onto the button 83 which radiates X-rays downwardly as in the conventional X-ray tube. When the cathode 79 is operable, as shown in Fig. 19B, it projects a broad beam of electrons onto the entire X-ray emitting surface. Some of the X-rays are radiated downwardly while others are transmitted through the lens 81 to a focal point or area. By shielding either of the X-ray streams, the tube may be used either in normal fashion or as an X-ray focusing device.

In Figs. 20A and 20B there is shown a similar device 84 in which a single hot cathode assembly 85 is used, instead of using two cold cathodes. Otherwise, the device is substantially the same in structure as that of Figs. 19A and 19B. In this instance the desired control of the electron beam is effected by means of a focusing electrode 86 to which different potentials may be applied. Air cooling fins 87 may be used to dissipate heat from the anode structure.

In Figs. 21 to 24 there is shown an arrangement by which the X-ray lens of the present invention may be utilized to advantage in conjunction with an X-ray tube which is arranged for movement relative to the lens. A supporting structure is provided comprising a pair of fixed standards 88 and 89 interconnected by a rigidifying transverse member 90, and a second pair of fixed standards 91 and 92 interconnected by a rigidifying transverse member 93. The standards 88 and 89 support a track 94, while the standards 91 and 92 support a track 95. The four standards also support a plate 96 having a central opening 97, on which the X-ray lens 98 is mounted. It will be seen that the opening 97 permits X-rays to pass therethrough toward a focal point or area 99. The plate 96 is formed of a material, such as lead, which is substantially non-transmissive to X-rays.

A carriage 100 is arranged for movement on the tracks 94 and 95, the carriage being provided with rollers 101 and 102 at opposite ends thereof for rolling engagement with the tracks. A second carriage 103 is supported by carriage 100 for movement thereon in transverse relation to the direction of movement of the carriage 100. To this end the carriage 100 is provided with tracks 104 and 105, and the carriage 103 is provided with rollers 106 and 107 for rolling movement on said tracks. The carriage 103 supports a vertically disposed X-ray tube 108 which projects X-rays downwardly as indicated at 109. The carriage 100 is provided with an elongate opening 110 to accommodate the X-ray tube and to permit movement thereof during movement of the carriage 103.

Figures 21, 22, 23, 24:
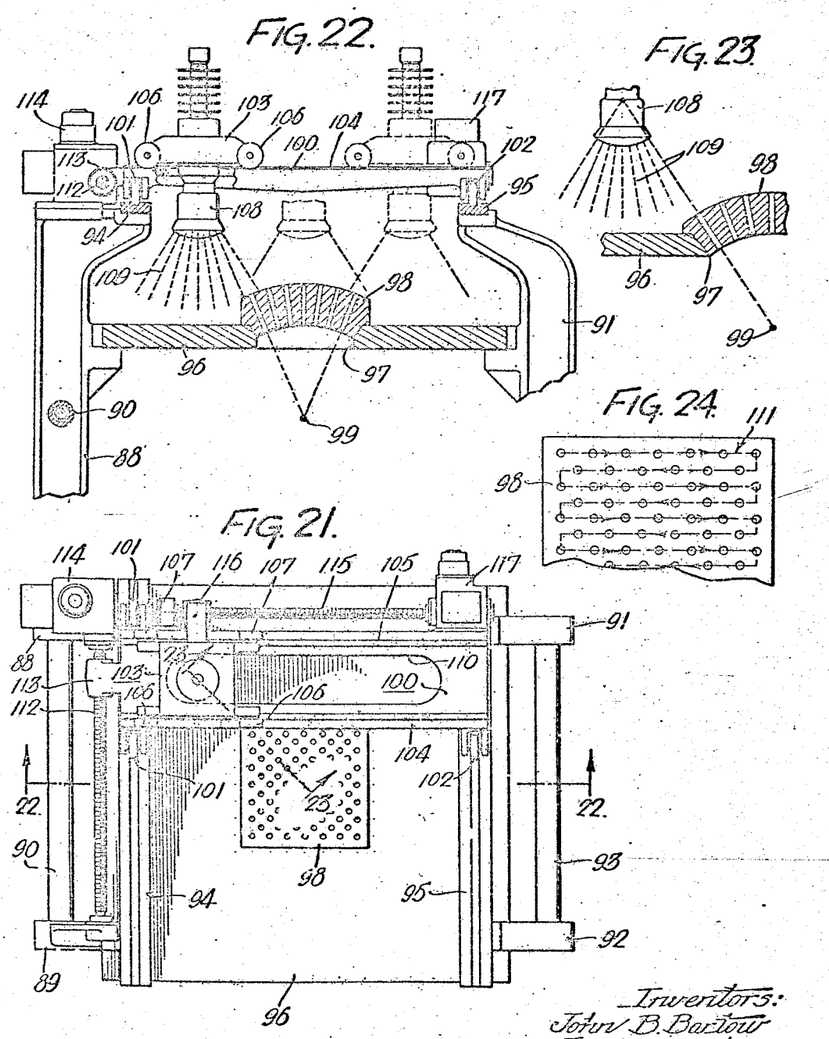
Fig. 21 is a plan view of an apparatus embodying the X-ray lens in conjunction with a movable X-ray tube.
Fig. 22 is a sectional view taken along line 22—22 of Fig. 21.
Fig. 23 is a fragmentary sectional view taken along line 23—23 of Fig. 21.
Fig. 24 is a fragmentary plan view of the lens showing the scanning thereof by X-rays from the tube.

By means of this arrangement, the X-ray tube may be moved in scanning relation to the lens 98 to effect successive transmission of certain of the X-rays to the focal point or area 99. The scanning movement is indicated in Fig. 24 by the broken line representation 111. As indicated by the arrowheads, the scanning movement comprises successive transverse motions back and forth in parallel paths corresponding to the rows of X-ray transmissive elements of the lens 98. The scanning is effected by first moving the carriage 103 from one end of its limited path of travel to the other end thereof, then moving the carriage 100 a short distance, then moving the carriage 103 back to the first end of its limited path of travel, and so on until the entire scanning operation is completed. The movements of the carriages may be effected manually or by suitable driving mechanism. As shown in Figs. 21 and 22 the carriage 100 may be driven by means of a screw shaft 112 rotatably supported by standards 88 and 89, and a screw-engaging nut member 113 provided on the carriage 100. The screw shaft 112 may be driven by a motor drive unit 114 which may be caused to operate intermittently to effect the desired intermittent motion of carriage 100. The carriage 103 may be similarly driven by means of a screw shaft 115 rotatably supported by carriage 100, and a screw-engaging nut portion 116 provided on the carriage 103. The screw shaft 115 may be driven by a motor drive unit 117 which may be caused to operate intermittently so as to effect the desired intermittent movement of the carriage 103. Suitable automatic controlling means may be utilized to control the operation of the driving units 114 and 117. However, these units could be manually controlled by manually operable switches.

Considering further the results accomplished by the scanning movement of the X-ray tube 108, it may be assumed that the position of the X-ray tube as shown in Figs. 21 and 22 is the starting position. In this position of the tube one of the X-rays from the tube will pass through the transmissive element of lens 98 at the corner thereof, as may be seen from Figs. 21 and 23. As the tube goes through its first transverse scanning motion, different X-rays therefrom will pass successively through the transmissive elements in the first row of such elements, as indicated in Fig. 24. This selective and successive transmission of different X-rays to the focal point or area is continued during each transverse scanning motion of the X-ray tube. The X-rays which are not transmitted are absorbed by the solid portions of the lens and by the shielding plate 96.

The above-described apparatus is particularly useful in hospitals and other places for localized X-ray treatment of the human body. With this arrangement the X-ray lens 98 is stationary and therefore the focal point or area 99 is fixed. It is an easy matter, therefore, to place a patient beneath the lens and the shielding plate 96 in proper position so that the particular portion of the patient's body to be treated coincides with the focal point or area 99. During the treatment, the portion of the body to be treated is subjected to the successively transmitted X-rays which are permitted to pass to the focal point or area 99 by reason of the above-described scanning movement of the X-ray tube. Such treatment is particularly applicable where it is desired that a localized point or area of the patient's body shall receive mild X-ray treatment over a time interval, rather than a strong X-ray treatment during a very short period of time. It should be noted, also, that the treatment by means of this apparatus can be varied by plugging some of the passages of the X-ray lens with material which is non-transmissive to X-rays, so that only some of the passages will be effective to transmit X-rays. It should, also, be noted that the apparatus may employ an ordinary X-ray tube and does not require any special tube construction.

Figure 25:
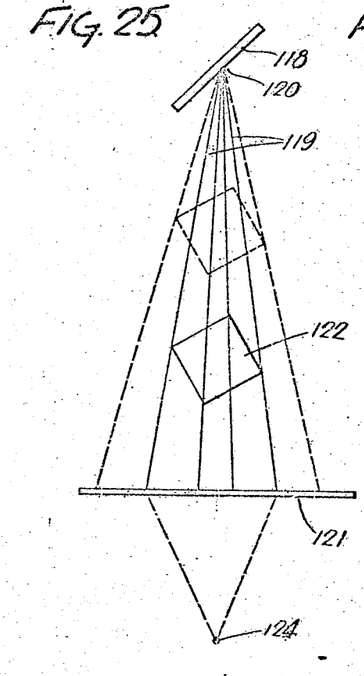
Figs. 25 to 28 are illustrations showing the application of the invention to X-ray photography or examination.
Figure 26:
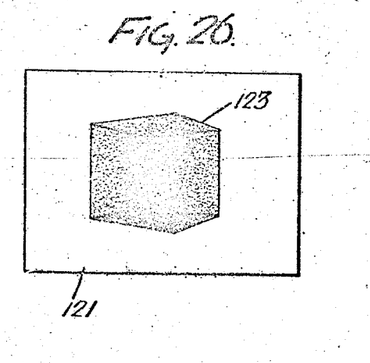

As indicated previously, the present invention is intended for application to any purpose for which it may be suited, and is not limited to X-ray treatment of the human body. By way of example, the invention may be applied to X-ray photography or fluoroscopy, and when thus applied it has important advantages as may be seen from a consideration of Figs. 25 to 28. In Fig. 25 there is shown an X-ray emitter 118 radiating X-rays 119 divergently from a point 120. An image plate or screen is represented at 121. This arrangement is that commonly used in X-ray photography or fluoroscopy. In the case of a fluoroscope, for example, an object such as the cube 122, when placed between the X-ray source 120 and the screen 121, will produce an image on the screen 121 as shown at 123 in Fig. 26, the image being visible from a viewing position such as represented at 124 in Fig. 25. Now if the object is removed away from the viewer to another position, as shown by the broken line illustration in Fig. 25, the image will be larger as may be seen from the projection lines. This is contrary to reality, since an object should appear smaller as it is moved away from the viewer point. Conversely, if the object 122 is moved toward the viewer the image will appear smaller. Furthermore, in any particular position of the object the image size is larger than the object itself, which is also contrary to reality. Thus the arrangement of Fig. 25 gives an incorrect reproduction of the object.

Figure 27:
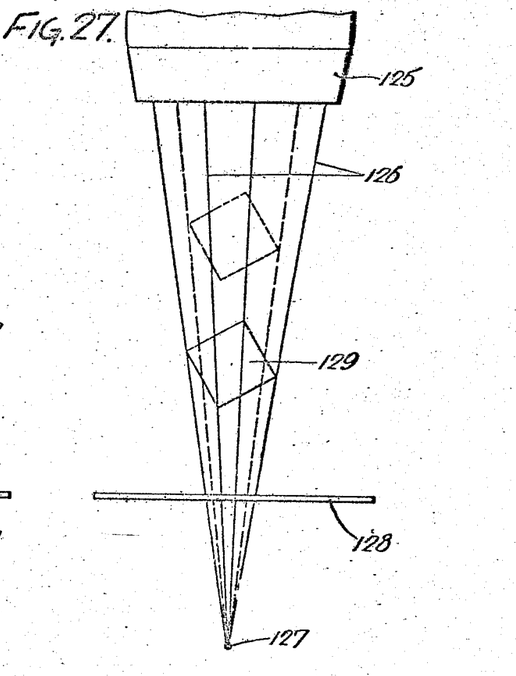
Figure 28:
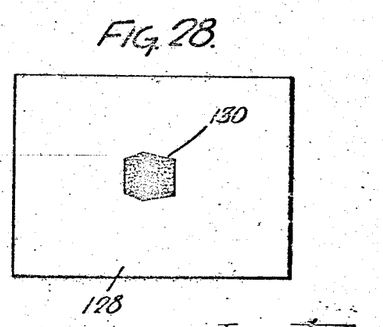

In Fig. 27 there is shown an arrangement utilizing the present invention, wherein the lens 125 of this invention directs X-rays 126 convergently toward a focal point 127. A fluorescent screen is represented at 128. An object 129 produces an image as shown at 130 in Fig. 28, the image being smaller than the object. Now if the object is moved away from the viewer to a position such as indicated by the broken line illustration in Fig. 27, the image will appear smaller. Conversely, if the object is moved toward the viewer the image will appear larger. This is in accord with reality, and it will be seen that utilization of the present invention gives a true viewing of the object. By utilizing the invention in stereoscopic X-ray apparatus, a true perspective of the object may be obtained. Thus, two lenses may be used to form two images which may be viewed stereoscopically or which may be photographed stereoscopically to obtain a true perspective viewing of the object or to obtain a true perspective picture of the object.

From the foregoing description it will be seen that the invention is capable of various applications and embodiments. It will be understood, of course, that the embodiments illustrated and described are merely examplary and are not intended to limit the invention.

We claim:

1. A device for producing directionally concentrated X-rays, comprising means for emitting electrons, an X-ray producing surface arranged to receive electrons from said first means, a lens member arranged for subjection to X-rays from said surface, said member having rectilinear X-ray transmissive elements but being otherwise non-transmissive to X-rays, said transmissive elements converging toward a focal point or area, whereby selected X-rays produced by said surface are transmitted by said elements toward a focal point or area, and means for causing impingement of electrons only on the portions of said surface adjacent to said elements.

2. A device according to claim 1, including means for producing an electron beam, means for causing said beam to scan the X-ray producing surface, and means for controlling the intensity of the beam according to the pattern of said lens member.

3. In combination, means for producing a narrow electron beam, an electron-excitable X-ray producing surface arranged for impingement of said electron beam thereon, means for effecting scanning motion of said beam to cause the beam to scan said surface, and means arranged cooperatively with said surface to effect selective transmission of X-rays from different points of said surface along predetermined paths, whereby the scanning motion of said beam causes successive transmission of X-rays from said points along said paths.

4. In combination, means for producing a narrow electron beam, an electron-excitable X-ray producing surface arranged for impingement of said electron beam thereon, means for effecting scanning motion of said beam to cause the beam to scan said surface, and an X-ray directing member adjacent said surface having X-ray transmissive elements extending from different points of said surface but being otherwise non-transmissive to X-rays, whereby the scanning motion of said beam causes successive transmission of X-rays from said points along said elements.

5. In combination, means for producing a narrow electron beam, an electron-excitable X-ray producing surface arranged for impingement of said electron beam thereon, means for effecting scanning motion of said beam to cause the beam to scan said surface, and an X-ray lens member adjacent said surface having X-ray transmissive elements extending from different points of said surface but being otherwise non-transmissive to X-rays, said transmissive elements converging toward a focal area, whereby the scanning motion of said beam causes successive transmission of X-rays from said points along said elements toward said focal area.

6. In combination: means for producing a narrow electron beam, an electron-excitable X-ray producing surface arranged for impingement of said electron beam thereon, means for effecting scanning motion of said beam to cause the beam to scan said surface, means arranged cooperatively with said surface to effect selective transmission of X-rays from different points of said surface along predetermined paths, whereby the scanning motion of said beam causes successive transmission of X-rays from said points along said paths, and means for preventing said beam from impinging on said surface at points other than the aforementioned points.

7. In combination: an X-ray-producing tube including means for producing a narrow electron beam, an electron-excitable X-ray producing surface on which said beam impinges, means for effecting scanning motion of said beam to cause the beam to scan said surface, and means for controlling the intensity of said beam; an X-ray directing member adjacent said surface having X-ray transmissive elements extending from different points of said surface but being otherwise non-transmissive to X-rays; a signal-producing cathode ray tube having scanning means and a target surface with a pattern thereon corresponding to the entrance face of said X-ray directing member; means for effecting synchronous scanning of both of said tubes; and means for applying the signal produced by the last-recited tube to the beam intensity-controlling means of the first-recited tube, thereby to control the intensity of the electron beam in the first-recited tube according to the pattern on the target surface of the last-recited tube.

8. In combination: an X-ray-producing tube including means for producing a narrow electron beam, an electron-excitable X-ray producing surface on which said beam impinges, means for effecting scanning motion of said beam to cause the beam to scan said surface, and means for controlling the intensity of said beam; an X-ray lens member adjacent said surface having X-ray transmissive elements extending from different points of said surface but being otherwise non-transmissive to X-rays, said transmissive elements converging toward a focal area; a signal-producing cathode ray tube having scanning means and a target surface with a pattern thereon corresponding to the entrance face of said X-ray lens member; means for effecting synchronous scanning of both of said tubes; and means for applying the signal produced by the last-recited tube to the beam intensity-controlling means of the first-recited tube, thereby to control the intensity of the electron beam in the first-recited tube according to the pattern on the target surface of the last-recited tube.

JOHN B. BARTOW.
JACK A. BARTOW.
GREY D. MacLAUGHLIN, Jr.

References Cited in the file of this patent

UNITED STATES PATENTS

| Number | Name | Date |
|---|---|---|
| 2,139,966 | Loebell | Dec. 13, 1938 |

FOREIGN PATENTS

| Number | Country | Date |
|---|---|---|
| 379,243 | Germany | Aug. 20, 1923 |
| 690,618 | Germany | Apr. 30, 1940 |
| 283,858 | Germany | Apr. 26, 1915 |